United States Patent [19]
Ostrowsky et al.

[11] 3,789,318
[45] Jan. 29, 1974

[54] STIMULATED EMISSION RADIATION SOURCE WITH ADJUSTABLE WAVELENGTH

[75] Inventors: Daniel B. Ostrowsky; Erich Spitz, both of Paris, France

[73] Assignee: Thomson-CSF, Paris, France

[22] Filed: May 9, 1972

[21] Appl. No.: 251,692

[30] Foreign Application Priority Data
May 14, 1971 France .............................. 7117557

[52] U.S. Cl. ...... 331/94.5 C, 350/150, 350/160 L C
[51] Int. Cl. ............................................... H01s 3/00
[58] Field of Search ...... 331/94.5; 350/160 LC, 150

[56] References Cited
UNITED STATES PATENTS
3,499,702  3/1970  Goldmacher et al. ..... 350/160 LC X
3,684,979  8/1972  Myer et al. ........................ 331/94.5

OTHER PUBLICATIONS

Weber et al: "Frequency–and Time–Dependent Gain Characteristics of Dye Lasers," IEEE Jour. of Quant. Elect., Vol. QE–5, pp 175–188, April, 1969.

Walther et al: "Tunable Dye Laser With Narrow Spectral Output," Applied Physics Letters, Vol. 17, pp 239–242, Sept. 15, 1970.

Soref: "Solid Facts about Liquid Crystals," Laser Focus Vol. 6, pp 45–49, Sept., 1970.

Primary Examiner—Edward S. Bauer
Attorney, Agent, or Firm—Cushman, Darby & Cushman

[57] ABSTRACT

The invention relates to stimulated emission radiation source and more precisely to a dye laser in which the control of the emitted radiation wavelength is effected by varying the quality factor of the resonant cavity by means of a thin film of a nematic liquid crystal arranged between two polarisers, the double-refracting property of the film being controlled by a voltage applied through transparent electrodes.

3 Claims, 1 Drawing Figure

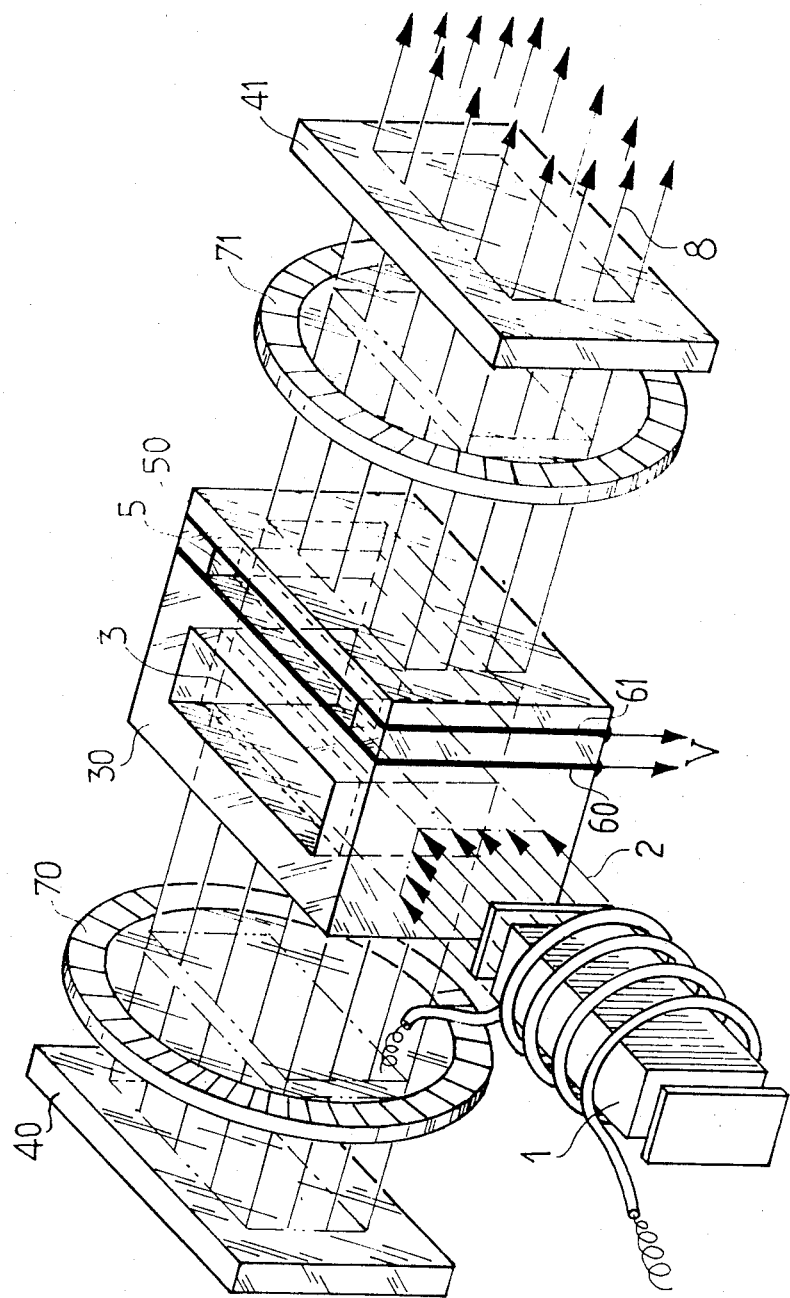

STIMULATED EMISSION RADIATION SOURCE WITH ADJUSTABLE WAVELENGTH

The present invention relates to a variable-wavelength laser utilising stimulated emission in a liquid medium of an amorphous material.

In dye lasers, which are also known as liquid lasers, the stimulated emission can be produced within a wide spectral range; a diffraction grating of variable inclination, introduced into the resonant cavity, can generally be used to select the desired wavelength.

It is also known to introduce into the resonant cavity of a laser device, a thin film of a nematic crystal, on which transparent electrodes are arranged, in order to select through the medium of voltage applied to the film one or more zones of oscillation within the cavity, the nematic crystal in this case working as a simple shutter.

The invention proposes that the electro-optical effect existing in nematic liquid crystal should be used to select the wavelength of emission of dye lasers. The use of the electro-optical effect makes it possible to obtain a device which is much more compact and to achieve much faster scanning of the spectral range than when a grating device is used. Compared with other materials generally used to obtain an electro-optical effect, nematic liquid crystals have the advantage of being much less expensive and of requiring only low control voltages which can be obtained readily from transistors.

According to the present invention, there is provided: stimulated emission radiation source, emitting wavelengths adjustable by means of applied voltages and comprising:

an active medium;

pumping radiation generator for producing said stimulated emission in said medium;

a nematic liquid crystal film, said film presenting a threshold voltage above which the dynamic scattering appears and having a first and a second face;

at least one first and one second electrode respectively arranged on said first and second faces;

means for applying said voltages between said first and second electrodes;

two polarisers;

a first and a second mirror, said second mirror being semi transparent;

said film being arranged between said polarisers, said mirrors forming an optical cavity, said cavity holding said active medium, said film and said polarisers.

For a better understanding of the invention and to show how the same may be carried into effect, reference will be made to the ensuing description and the attached FIGURE which shows a stimulated emission optical source with adjustable wavelength in accordance with the invention.

In accordance with the example illustrated, a pumping light source 1 supplies an excitatory light beam 2 which triggers stimulated emission in an active medium 3 filling a vessel 30 with plane transparent walls; the beam 2 is perpendicular to two of the faces of the vessel. Parallel to two other faces there are arranged two mirrors, one of which 40 is totally reflective and the other 31 semi-transparent, these forming a resonant optical cavity of high quality factor.

A similar vessel 50, transparent and extremely narrow considered in the direction of the axis of the optical cavity, adjoins the vessel 30 and shares with the latter one of its faces; it contains the nematic liquid crystal film 5. The internal walls of the vessel 50 are covered by conductive transparent films forming two electrodes 60 and 61 which embrace the liquid crystal film and carry a variable potential difference V. Inside the resonant cavity and at either side of the vessels, two polarisers 70 and 71 are arranged in planes parallel to those of the mirrors.

The wavelength of the parallel light beam 8 leaving the semi-transparent mirror 41 can be controlled by acting on the potential difference V applied to the two electrodes 60 and 61.

As a matter of fact it is well known that nematic crystals, which are normally double-refracting, exhibit furthermore very marked induced double-refraction when submitted to the action of an electric field. This effect is produced in respect of small applied voltages V, lower than the threshold voltage $V_D$ in respect of which the dynamic scattering effect is produced; it is also closely dependent upon the wavelength.

Let us now consider, by way of example, the configuration in which the polarisers are crossed and at 45° to the principal direction of oscillation of the nematic crystal film. For a given wavelength, within the spectral range where stimulated emission of the active medium can occur, there will always be a bias voltage V such that the film behaves as a half-wave plate. At this wavelength, the plane of polarisation fixed by the first polariser, will rotate through a right-angle on transit through the film and the wave will be transmitted without attenuation by the second polariser; the quality factor of the cavity is inchanged. The further away one moves from this wavelength, for the same applied voltage, the more elliptical will be the vibration transmitted by the film, the more it will be attenuated by the second polariser and the greater will be the reduction in the quality factor of the cavity. Thus, it is provided a means for controlling, through a single voltage, the quality factor of the cavity and consequently the wavelength of the stimulated emission.

The system described can operate in conjunction with a wide variety of active media. One possible example is umbelliferone in solution in a liquid or in a host of amorphous material; the spectral range within which it is thus possible to produce stimulated emission, is around 2,000 A. An excellent pumping source for this kind of medium is constituted by a pulsed nitrogen laser whose emission is in the ultra-violet range.

The nematic crystal film controlling the wavelength of the stimulated emission can be extremely thin, in the order of ten microns for example; it is then perfectly transparent. It is possible to use layers of tin-oxide as the transparent electrodes.

The bias voltage applied to the electrodes will vary between 0 and 5 volts; and induced double-refraction then establishes in only a few milliseconds. A possible variant embodiment, applied to the case where it is desired that the induced double-refraction shall be established more rapidly, consists in biasing the film with pulses of duration shorter than 50 ns, and synchronised with the pulses controlling the laser excitation, the peak voltage varying around 50 volts;

although this voltage is very much higher than the threshold beyond which the dynamic scattering effect is produced, the latter does not have time to develop because of the small duration of the pulse. These voltages are low if compared with those required by other electro-optical devices currently known.

The geometric arrangement of the resonant cavity system is remarkably simple and compact. One of the chief advantages of the configuration described in accordance with the invention is that the emissive area of the active medium can be relatively large. This property can be exploited in order to arrange, on one of the faces of the nematic crystal film, several different electrodes controlled by independent voltages, the common electrode situated on the other face being placed at a reference potential. In this fashion, the monochromatic beam 8 can be replaced by as many parallel adjacent beams as there are independent electrodes, the wavelength of each beam also being capable of separate adjustment.

What we claim is:

1. Stimulated emission radiation source, emitting wavelengths adjustable by means of applied voltages and comprising:
   an active medium;
   pumping radiation generator for producing said stimulated emission in said medium;
   a nematic liquid crystal film, said film presenting a threshold voltage above which the dynamic scattering appears and having a first and a second face;
   at least one first and one second transparent electrode respectively arranged on said first and second faces;
   means for applying said voltages between said first and second electrodes;
   two polarisers;
   a first and a second mirror, said second mirror being semi transparent;
   said film being arranged between said polarisers, said mirrors forming an optical cavity, said cavity holding said active medium, said film and said polarisers.

2. Source as claimed in claim 1, wherein said applied voltages have values less than said threshold voltage.

3. Source as claimed 1, claim 1 wherein said pumping radiation being emitted by said generator in form of radiation pulses, said voltages are applied to said transparent electrodes in form of voltage pulses, said voltage pulses being synchronised with said radiation pulses and having a peak value higher than said threshold voltage.

* * * * *